United States Patent
Mahmoudkhani et al.

(10) Patent No.: US 9,475,975 B2
(45) Date of Patent: Oct. 25, 2016

(54) DEFOAMING COMPOSITIONS AND PROCESSES FOR CEMENTING APPLICATIONS

(75) Inventors: Amir H. Mahmoudkhani, Atlanta, GA (US); Robert E. Wilson, Atlanta, GA (US); Luciana Bava, Atlanta, GA (US); Jacob A. Rocker, Atlanta, GA (US)

(73) Assignee: Kemira Oyj, Helsinki (FI)

( * ) Notice: Subject to any disclaimer, the term of this patent is extended or adjusted under 35 U.S.C. 154(b) by 35 days.

(21) Appl. No.: 13/036,397

(22) Filed: Feb. 28, 2011

(65) Prior Publication Data

US 2012/0220692 A1    Aug. 30, 2012

(51) Int. Cl.
| | |
|---|---|
| *C09K 8/00* | (2006.01) |
| *C04B 7/00* | (2006.01) |
| *C04B 16/00* | (2006.01) |
| *C04B 24/00* | (2006.01) |
| *E21B 33/13* | (2006.01) |
| *C09K 8/467* | (2006.01) |
| *C04B 24/32* | (2006.01) |
| *C04B 28/02* | (2006.01) |
| *C09K 8/48* | (2006.01) |
| *C04B 103/50* | (2006.01) |

(52) U.S. Cl.
CPC ............... *C09K 8/467* (2013.01); *C04B 24/32* (2013.01); *C04B 28/02* (2013.01); *C09K 8/48* (2013.01); *C04B 2103/50* (2013.01); *Y02W 30/94* (2015.05)

(58) Field of Classification Search
CPC ...................................................... C04B 24/32
USPC ........................................................ 523/130
See application file for complete search history.

(56) References Cited

U.S. PATENT DOCUMENTS

| | | |
|---|---|---|
| 5,460,698 A | 10/1995 | Nguyen |
| 5,466,289 A | 11/1995 | Yonezawa |
| 5,661,206 A | 8/1997 | Tanaka |
| 6,063,183 A | 5/2000 | Goisis |
| 6,919,388 B2 * | 7/2005 | Nishikawa et al. ............. 524/4 |
| 7,030,178 B2 * | 4/2006 | Shiba et al. ..................... 524/5 |
| 2007/0012222 A1 | 1/2007 | Szymanski et al. |
| 2008/0220994 A1 | 9/2008 | Chatterji |
| 2010/0292380 A1 | 11/2010 | Martin et al. |
| 2011/0226164 A1 | 9/2011 | Andrioletti et al. |
| 2012/0220692 A1 | 8/2012 | Mahmoudkhani et al. |

FOREIGN PATENT DOCUMENTS

| | | |
|---|---|---|
| EP | 1308427 | 5/2003 |
| EP | 2072559 | 6/2009 |
| WO | 2009036128 A1 | 3/2009 |

\* cited by examiner

*Primary Examiner* — David Karst
(74) *Attorney, Agent, or Firm* — King & Spalding

(57) ABSTRACT

Cement compositions and processes for reducing air entrainment in a cement composition generally include mixing a hydraulic cement with a defoamer composition including an organic acid ester of a polyoxyethylene-polyoxypropylene block copolymer.

17 Claims, 1 Drawing Sheet

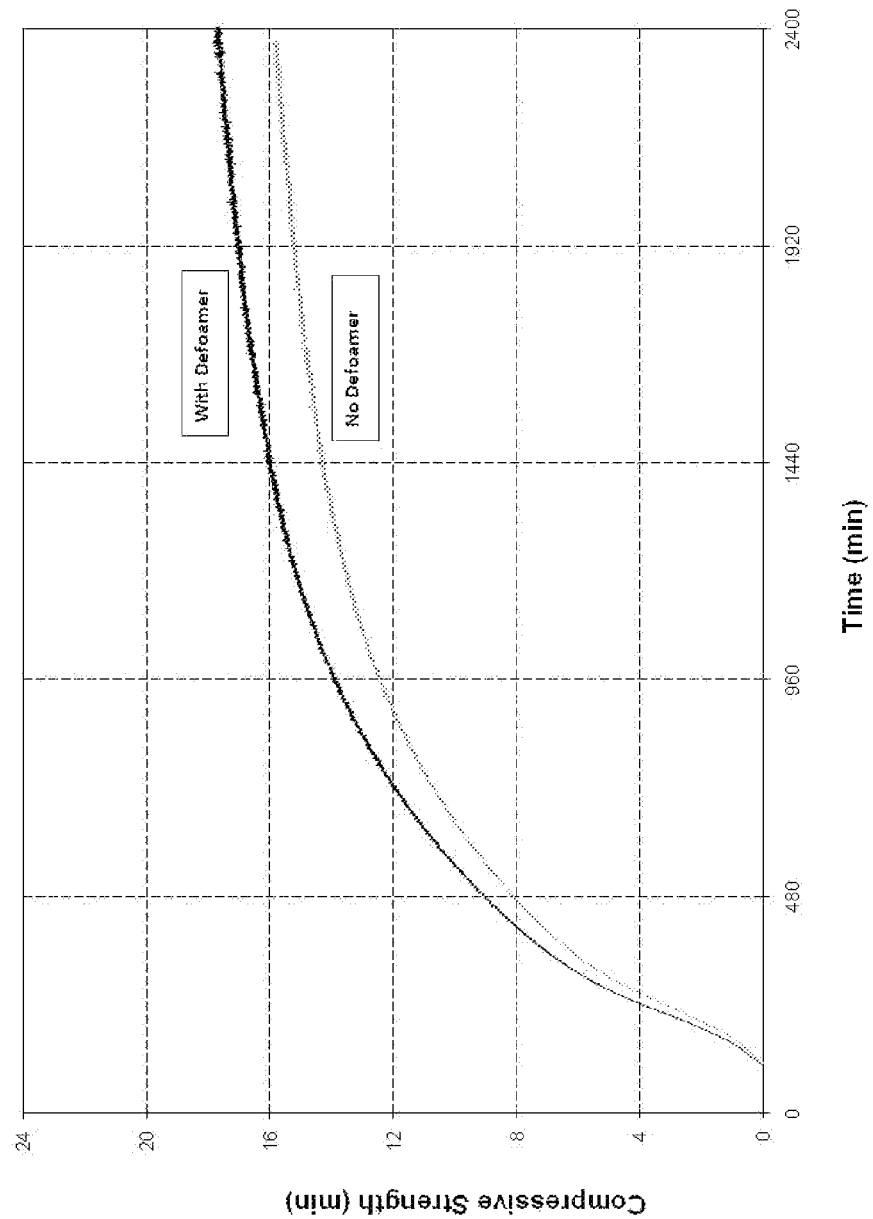

DEFOAMING COMPOSITIONS AND PROCESSES FOR CEMENTING APPLICATIONS

BACKGROUND

The present disclosure generally relates to defoaming compositions and methods for preventing or breaking foam or entrainment of gas in oil and gas well treatment fluids.

In the drilling and completion of an oil or gas well, a cement composition is introduced to the well bore for cementing pipe string or casing. In this process, known as "primary cementing", the cement composition is pumped into the annular space between the walls of the well bore and the casing. The cement composition sets in the annular space, supporting and positioning the casing, and forming a substantially impermeable barrier, or cement sheath, which isolates the well bore from subterranean zones. Cement compositions are also used for remedial operations such as squeeze cementing.

Portland cement systems for well cementing are routinely designed to perform at temperatures ranging from below freezing point in permafrost zones to about 350° C. in thermal recovery and geothermal wells. Well cements also encounter the pressure range from near ambient in shallow wells to more than 30,000 pounds per square inch (psi) in deep wells. In addition, they may also be designed to contend with other field and operating conditions. Chemical additives are often used to modify the behavior and properties of cement systems, ideally allowing successful slurry placement, proper setting, and adequate zonal isolation during the lifetime of the well.

Several cement additives such as retarders, dispersants, fluid loss control additives, and gas migration control additives can cause the slurry to foam during mixing. Excessive slurry foaming can have several undesirable consequences such as loss of hydraulic pressure during pumping due to cavitation in the mixing system. In addition, air entrainment may cause undesired slurry densities at downhole. During slurry mixing, a densitometer or mass flow meter is used to help field operators proportion the ingredients. If air is present in the slurry at the surface, the density of the system "cement+water+air" is measured by the densitometer. Since the air becomes compressed downhole, the true downhole slurry density becomes higher than the measured surface density. Antifoaming or defoaming agents are usually added to the mix water or dry-blended with the cement to prevent such problems. They may also be used for breaking foamed fluids. In such applications, defoamer may be utilized to break the excess foamed fluid returned to surface after well treatment and thus facilitate disposal process. In general, desirable antifoaming or defoaming agents, have the following characteristics to be effective: a) insoluble in the foaming system, and b) lower surface tension than the foaming system. The antifoaming agent functions largely by spreading on the surface of the foam or entering the foam lamella. Because the film formed by the spread of antifoam on the surface of a foaming liquid does not support foam, the foam situation is alleviated.

There are two general classes of defoaming agents commonly used for cementing applications: alkoxylated alcohols and silicones. Silicone defoaming agents, while very effective, are not readily biodegradable and are relatively expensive when compared to other chemistries. As to the alkoxylated alcohols, these materials are generally not very effective.

Accordingly, there is an ongoing need for high performance non-silicone defoaming compositions and methods that have better environmental profile and provide defoaming properties equivalent or higher than silicone based defoaming agents for reducing the entrained air in the cement fluids and for achieving desired density.

BRIEF SUMMARY

Disclosed herein are defoaming compositions, cement compositions including the defoaming composition, and processes for reducing air entrainment in cement compositions. In one embodiment, a process for reducing air entrainment in a cement composition comprises adding a defoaming composition to a cement composition, wherein the defoaming composition comprises an organic acid ester of a polyoxyethylene-polyoxypropylene block copolymer; and reducing air entrainment in the cement composition relative to a cement composition without the defoaming composition.

A cement composition comprising hydraulic cement; water; and a defoaming composition comprising an organic acid ester of a polyoxyethylene-polyoxypropylene block copolymer.

A method of cementing a subterranean formation comprises displacing a cement composition into the subterranean formation, the cement composition comprising hydraulic cement, water; and a defoaming composition comprising an organic acid ester of a polyoxyethylene-polyoxypropylene block copolymer; and allowing the cement to set.

The disclosure may be understood more readily by reference to the following detailed description of the various features of the disclosure and the examples included therein.

DETAILED DESCRIPTION

Defoaming compositions and processes for reducing the amount of gas present in a fluid such as a cement composition are provided. The defoaming composition generally includes an organic acid ester of an ethylene oxide-propylene oxide block copolymer (i.e., polyoxyethylene-polyoxypropylene block copolymer or EO/PO block copolymer) that has a low acid number, and optionally, can be formulated with hydrophobic solids. This defoaming composition provides effective foam control by reducing air entrainment relative to other conventional defoamers, is relatively biodegradable, and is less toxic.

The block copolymer of ethylene oxide and propylene oxide is not intended to be limited to any particular structure and is commercially available in several types. Suitable polyoxyethylene-polyoxypropylene copolymers are terminated with hydroxyl groups and generally have an average molecular weight of 1000 to 5000 Daltons, and in other embodiments, an average molecular weight of 2000 to 4000 Daltons, and in still other embodiments, an average molecular weight of 2000 to 2750 Daltons and preferably possess a melting point below 20° C. For example, Polaxamers are nonionic triblock copolymers composed of a central hydrophobic chain of polypropylene oxide flanked by two hydrophilic chains of polyethylene oxide. A schematic representation of a Poloxamer copolymer is shown here:

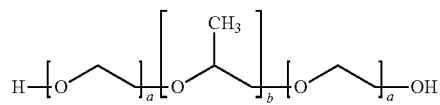

The ethylene oxide and propylene oxide block copolymers are also known by trade names Pluronic® from BASF and Mulsifan from Zschimmer & Schwarz GmbH & Co. Because the lengths of the polymer blocks can be customized, many different EO/PO block copolymers exist having slightly different properties.

The organic acid ester of the ethylene oxide-propylene oxide block copolymer is the reaction product of the block copolymer and an organic acid including mono-, di- or multi-carboxylic acid functionalities.

The organic acid ester of the ethylene oxide-propylene oxide is of the general structure:

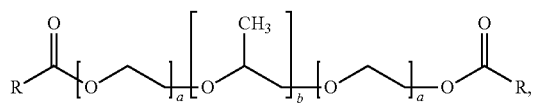

wherein R is a linear or branched, saturated or unsaturated, alkyl or alkyl carboxylate group or aryl or aryl carboxylate group having from 3 to 40 carbon atoms, a is 2 to 8 and b is 16 to 67. As noted above, the composition has a low acid value. In one embodiment, the acid value is less than 15, and in other embodiments, the acid value is less than 5. As used herein, the term acid value generally refers to the number of milligrams of potassium hydroxide needed to neutralize the carboxylic acid groups in one gram of polymer. Thus, in the case of di- and multi-carboxylic acid esters, the free carboxylic acid groups, if present, may be further esterified to prevent adverse effects on other fluid properties. The particular block structure is not intended to be limited and may have an ordered (EO-PO-EO or PO-EO-PO) or random arrangements. For example, in some embodiments, the polyoxyethylene-polyoxypropylene portion has a polyoxypropylene backbone with polyoxyethylene end cap whereas in other embodiments, the polyoxyethylene-polyoxypropylene acid esters have a polyoxyethylene backbone with polyoxypropylene end caps. Still further, in some embodiments, the backbone alkyl group R may further include hydroxyl containing substituents such as may occur using castor oil derivatives as the di or multicarboxylic acid.

The polyoxyethylene-polyoxypropylene organic acid esters can be prepared by conventional means such as by a condensation reaction of the desired alcohol (e.g., polyethylene glycol-polypropylene glycol (EO/PO) block polymer) with a mono-, di- or multi-carboxylic acid in the presence of a suitable catalyst at an elevated temperature. Alternatively, the polyoxyethylene-polyoxypropylene organic acid esters can be prepared by transesterification of the EO/PO block copolymer with a triglyceride of the desired mono-, di-, or multi-carboxylic acid and a base such a potassium hydroxide or other suitable alkalis as the catalyst.

Exemplary organic acids include, without limitation, oleic acid, stearic acid, suberic acid, azelaic acid, sebacic acid, phthalic acid, isophthalic acid, terephthalic acid, and mixtures thereof.

The optional hydrophobic solids such as silicon dioxide (silica) may be used to enhance the performance of the esters defoaming ability. The hydrophobic silica may fumed, precipitated, or a mixture thereof. Other suitable hydrophobic solids include talc, clays, aluminosilcates, mica, alumina and such.

The defoaming composition including the organic acid ester of the ethylene oxide-propylene oxide block copolymer as described above can be added to cement compositions at 0.01 to 1% by weight of the cement (BWOC). When used in combination with the hydrophobic silica, the weight ratio of the hydrophobic silica to the acid ester of an ethylene oxide-propylene oxide block copolymer is generally between 0.1 to 10 weight percent. Higher amounts could be used although processing and handling the product can become a concern. In other embodiments, the weight ratio of the hydrophobic silica to the acid ester of the ethylene oxide-propylene oxide block copolymer is 3 to 10 weight percent.

The defoaming compositions can be added to the cement composition before, during, or after blending of the various components of the cement composition. The defoaming compositions can be added as a liquid or as an emulsion or as dry products as may be desired for the intended application. In one exemplary embodiment, the defoaming composition can be combined with a cementitious material and a fluid such as water to form the cement composition before or during the blending of those components. This blending can occur at the pumphead, which displaces the cement composition down through the annulus of a wellbore (i.e., the area between a pipe in the wellbore and the wall of the wellbore) wherein it is allowed to set into a hard cement. The defoaming compositions serve to prevent or reduce the formation of foam during the preparation or pumping of the cement composition or to break the foam from a well treatment fluid returned to the surface. In another embodiment, the defoaming composition can be added to an already prepared cement composition before pumping the composition into a subterranean formation where it is allowed to set into a hard cement. In this case, the defoaming composition can serve to prevent or reduce the formation of foam in the cement composition as it is being pumped. In each of these embodiments, the ability of the defoaming composition to reduce the level of gas entrained in the cement composition can result in the formation of relatively stronger cement that can properly support the piping in the wellbore. The defoaming composition can also be incorporated in the cement composition to help control the density of the ensuing hardened cement. In yet another embodiment, the defoaming compositions can be combined with a previously foamed wellbore treatment fluid such as a foamed cement or foamed drilling mud to break or reduce the foam therein. Due to the removal of the foam, the wellbore treatment fluid can be readily disposed of after its use.

As mentioned above, cement compositions can include the defoaming compositions described herein, a cementitious material, and a sufficient amount of fluid to render the cement compositions pumpable. Any of a variety of cements suitable for use in subterranean cementing operations may be used. The cementitious material can include, for example, hydraulic cements which set and harden by reaction with water. Examples of suitable hydraulic cements include but are not limited to Portland cements such as class A, B, C, G, and H cements according to American Petroleum Institute (API) specification for materials and testing for well cements, pozzolana cements, gypsum cements, phosphate cements, high alumina content cements, slag cements, cement kiln dust, silica cements, high alkalinity cements, and combinations comprising at least one of the foregoing cements. Examples of suitable fluids for use in the cement compositions include, but are not limited to, fresh water, produced water, an unsaturated aqueous salt solution, a saturated aqueous salt solution such as brine or seawater, and combinations comprising at least one of the foregoing.

As deemed appropriate by one skilled in the art, additional additives can be added to the cement composition for improving or changing the properties of the cement. Examples of such additives include but are not limited to set retarders, fluid loss control additives, dispersing agents, set accelerators, and formation conditioning agents. Other additives such as bentonite and silica fume can be introduced to the cement composition to prevent cement particles from settling to the bottom of the fluid. Further, a salt such as sodium chloride or potassium chloride can be added to the cement composition.

The defoaming compositions described herein can be included in various flowable end use materials to reduce the amount of entrained gas present in such materials. In addition to cement compositions, other examples of such end use materials include but are not limited to various wellbore treatment fluids such as drilling fluids. The various components of such compositions would be apparent to persons of ordinary skill in the art.

The following examples are presented for illustrative purposes only, and are not intended to limit the scope of the invention.

Example 1

In this example the compressive strength was measured for cement compositions with and without a defoaming agent. The defoaming agent was the diesterification product of oleic acid with a primary hydroxyl terminated polyoxyethylene-polyoxypropylene block copolymer (generally designated as EO/PO DO) with an average molecular weight of about 2,000 Daltons. Compressive strength data up to 24 hours for API class A and class G cements at a density of 1500 and 1900 kg/m$^3$, respectively, are given in Table 1. Compressive strength testing was carried out on CTE Model 2000-5 Ultrasonic Cement Analyzer according to API RP 10B-2 (Recommended Practice for Testing Well Cements) operating at 4000 psi pressure. The results show that defoamer containing cements meet the necessary requirements for compressive strength and that the defoamer compositions can be used to create viable and useful cement blends with no retarding effect on cement hydration.

TABLE 1

Compressive strength data

| Blend | Density (Kg/m$^3$) | BHST (° C.) | Additives (wt %) | Compressive Strength (MPa) | | | |
|---|---|---|---|---|---|---|---|
| | | | | 4 hrs | 8 hrs | 16 hrs | 24 hrs |
| Cem G | 1900 | 50 | 0 | 3.69 | 9.22 | 14.49 | 16.66 |
| Cem G | 1900 | 50 | 0.1% EO/PO DO | 3.94 | 9.08 | 13.98 | 16.05 |
| Cem A | 1500 | 50 | 0 | 1.62 | 3.15 | 4.62 | 5.35 |
| Cem A | 1500 | 50 | 0.1% EO/PO DO | 1.56 | 3.05 | 4.54 | 5.30 |

BHST: Bottom Hole Static Temperature
Cem G = API class G cement
Cem A = API class A Cement Example 2

In this example, the effect of defoamer composition on the rheology of API class G cement blends with density of 1900 kg/m$^3$ was studied using a Fann 35A viscometer at 25 and 50° C. The defoaming agent was the diesterification product of oleic acid with a polyoxyethylene-polyoxypropylene block copolymer (EO/PO DO) with an average molecular weight of 2565 Daltons. The slurry was prepared by mixing dry cement and tap water on a Waring blender according to API RP 10B-2 and allowed to condition for 20 minutes using a Chandler Engineering model 1200 Atmospheric Consistometer at the given temperature. The rheology data is given in Table 2. It has been found that defoamer composition had no effect on the rheological behavior of cement slurries.

TABLE 2

Effect of defoamer composition on 1900 kg/m$^3$ blend of API cement G

| Defoamer 0.2 wt % | Temperature ° C. | Shear Rate (rpm) | | | | | |
|---|---|---|---|---|---|---|---|
| | | 600 | 300 | 200 | 100 | 6 | 3 |
| None | 25 | 109 | 77 | 60 | 49 | 21 | 12 |
| EO/PO DO | 25 | 107 | 77 | 63 | 49 | 22 | 13 |
| None | 50 | 106 | 83 | 72 | 60 | 22 | 13 |
| EO/PO DO | 50 | 106 | 83 | 71 | 61 | 22 | 14 |

Example 3

In this example, defoaming characteristics of various diesterified polyoxyethylene-polyoxypropylene block copolymers on API class cement G slurries containing 15% by weight of cement (BOWC) of a styrene-butadiene latex were examined. The diesters were formed using oleic acid (designated using DO) or stearic acid (designated using EO/PO DS). Styrene-butadiene rubber latex is a commonly used in formulating cement slurries and is generally known to cause foaming in cement mixing. Densities were measured immediately after the slurry was prepared (based on API RP 10B-2 procedure) using a graduated cylinder and weight of a 100 mL slurry. Data are summarized in Table 3. All defoamer compositions tested were found to be effective on reducing air entrainment when added at 0.2% BWOC.

TABLE 3

Defoamer performance on API Class G cement slurries blended with latex solution with designed density of 1850 kg/m$^3$.

| Slurry | Defoamer Composition* | Average Molecular Weight | Measured Density (kg/m$^3$) |
|---|---|---|---|
| 1 | None | — | 1261 ± 20 |
| 2 | EO/PO DO | 1665 | 1684 ± 20 |
| 3 | EO/PO DO | 2565 | 1721 ± 20 |
| 4 | EO/PO DO | 3315 | 1747 ± 20 |
| 5 | EO/PO DO | 4365 | 1594 ± 20 |
| 6 | EO/PO DS | 4369 | 1625 ± 20 |
| 7 | EO/PO DO | 4965 | 1543 ± 20 |

*Defoamer compositions are added at 0.2% BWOC

Example 4

In this example, the effect of various additions of EO/PO with average molecular weight of 2000 that had been esterified with oleic acid (designated using EO/PO DO) on defoaming cement slurries with a styrene-butadiene latex solution were examined. The defoamer was added at 0.10 to 0.30% by weight of the cement (BWOC) to the slurry. Densities were measured immediately after the slurry was prepared (according to API RP 10B-2 procedure) using a graduated cylinder and weight of a 100 mL slurry. As shown in Table 4 below, the defoamer exhibits excellent performance on the sample cement compositions of both API class G and class A cements.

TABLE 4

Effect of defoamer additions on API Class G and
Class A cement slurries blended with a latex solution
for designed density of 1850 kg/m³

| API Class Cement | EO/PO DO (% BWOC) | Measured Density (kg/m³) |
|---|---|---|
| G | None | 1261 ± 20 |
| G | 0.10 | 1635 ± 20 |
| G | 0.20 | 1743 ± 20 |
| G | 0.30 | 1779 ± 20 |
| A | None | 1560 ± 20 |
| A | 0.10 | 1712 ± 20 |
| A | 0.20 | 1793 ± 20 |
| A | 0.30 | 1827 ± 20 |

Example 5

Many cement additives can cause the slurry to foam during mixing including surface active agents such as dispersants. In this example, performance of various EO/PO dioleic acid esters (EO/PO DO) were examined in a highly foaming system containing sodium lignosulfonate (4% BWOC), sodium chloride (20% BWOW) and API class G cement with a designed density of 1850 kg/m³. As shown in Table 5, in the absence of defoamer, air entrainment causes the slurry density (1140 kg/m³) to be significantly lower than the designed density of 1850 kg/m³. In contrast, all defoamer compositions (added at 0.2% BWOC) were effective in antifoaming such a system.

TABLE 5

Defoamer performance on API Class G cement slurries blended with
dispersant and salt solution with designed density of 1850 kg/m³

| Slurry | Defoamer Composition | Average Molecular Weight | Measured Density (kg/m³) |
|---|---|---|---|
| 1 | None | — | 1140 ± 20 |
| 2 | EO/PO DO | 1665 | 1659 ± 20 |
| 3 | EO/PO DO | 2565 | 1697 ± 20 |
| 4 | EO/PO DO | 3315 | 1715 ± 20 |
| 5 | EO/PO DO | 4365 | 1661 ± 20 |
| 6 | EO/PO DO | 4965 | 1716 ± 20 |

Example 6

In this example, the effect on the addition of 0.1 to 0.2% of EO/PO DO, a dioleic esterified polyoxyethylene-polyoxypropylene block copolymer having an average molecular weight of 3315, by weight of cement (BWOC) on a cement composition containing 4% BWOC sodium lignosulfonate as the dispersant was examined. Slurry density was measured immediately after mixing the dry cement with water and the dispersant. As shown in Table 6 below, EO/PO DO defoamer was an effective antifoaming agent based on proximity of measured density and design density data.

TABLE 6

Effect of defoamer additions on API Class G cement
slurries blended with a sodium lignosulfonate dispersant
for designed density of 1850 kg/m³

| Slurry | EO/PO DO (% BWOC) | Measured Density (kg/m³) |
|---|---|---|
| 1 | None | 1578 ± 20 |
| 2 | 0.10 | 1830 ± 20 |

TABLE 6-continued

Effect of defoamer additions on API Class G cement
slurries blended with a sodium lignosulfonate dispersant
for designed density of 1850 kg/m³

| Slurry | EO/PO DO (% BWOC) | Measured Density (kg/m³) |
|---|---|---|
| 3 | 0.15 | 1836 ± 20 |
| 4 | 0.20 | 1856 ± 20 |

Example 7

In this example, the performance of EO/PO DO ester (a dioleic esterified polyoxyethylene-polyoxypropylene block copolymer with average molecular weight of 3315 Daltons) on defoaming slurries from API class G cement blended with 4% BWOC dispersant; sodium polynaphthalene sulfonate (A) or sodium lignosulfonate (B); and 20% sodium chloride solution in water was evaluated. As shown in Table 7, the EO/PO DO ester was an effective antifoaming agent.

TABLE 7

Effect of defoamer additions on API Class G cement
slurries blended with dispersant (4% BWOC) and salt (20%
BWOW) for designed density of 1850 kg/m³.

| Dispersant | EO/PO DO % BWOC | Measured Density (kg/m³) |
|---|---|---|
| A | None | 1514 ± 20 |
| A | 0.10 | 1707 ± 20 |
| A | 0.15 | 1677 ± 20 |
| A | 0.20 | 1684 ± 20 |
| B | None | 1140 ± 20 |
| B | 0.10 | 1723 ± 20 |
| B | 0.15 | 1698 ± 20 |
| B | 0.20 | 1715 ± 20 |

A = Sodium polynaphthalene sulfonate
B = Sodium lignosulfonate

Example 8

In this example, the effect of silica content in the defoamer composition on Class G cement and latex slurries with designed density of 1850 kg/m³ was analyzed. The EO/PO DO was a dioleic esterified polyoxyethylene-polyoxypropylene block copolymers with an average molecular weight of about 2565 Daltons. The results are shown in Table 8.

TABLE 8

| API Class Cement | EO/PO DO (%) | Precipitated Silica wt % in Defoamer | Measured Density (kg/m³) |
|---|---|---|---|
| G | 0 | None | 1261 ± 20 |
| G | 0.2 | None | 1764 ± 20 |
| G | 0.2 | 2.0 | 1784 ± 20 |
| G | 0.2 | 6.0 | 1737 ± 20 |
| G | 0.2 | 10.0 | 1742 ± 20 |

As shown in Table 8, effective defoaming was provided with and without inclusion of hydrophobic silica in the defoamer composition as evidenced by the increased density.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for reducing air entrainment in a cement composition, the process comprising:
adding a defoaming composition to a cement composition, wherein the defoaming composition comprises an organic acid ester of a polyoxyethylene-polyoxypropylene block copolymer; and
reducing air entrainment in the cement composition relative to a cement composition without the defoaming composition; wherein the polyoxyethylene-polyoxypropylene organic acid ester is a diesterification reaction product of a polyoxyethylene-polyoxypropylene block copolymer and oleic acid; and
wherein the organic acid ester of the polyoxyethylene-polyoxypropylene block copolymer is of the general structure:

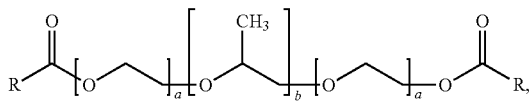

wherein R is $(CH_2)_7CH=CH(CH_2)_7CH_3$;
a is 2 to 8; and
b is 16 to 67.

2. The process of claim 1, wherein the organic acid ester of the polyoxyethylene-polyoxypropylene block copolymer has an average molecular weight of 1650 to 5000 Daltons.

3. The process of claim 1, wherein the adding the defoaming composition to the cement composition is at 0.01 to 1% by weight of the cement.

4. The process of claim 1, further comprising adding hydrophobic silica to the cement composition.

5. The process of claim 4, wherein a weight ratio of the hydrophobic silica to the acid ester of the polyoxyethylene-polyoxypropylene block copolymer is between 0.1 to 10 weight percent.

6. The process of claim 4, wherein the hydrophobic silica is hydrophobized silica fume or precipitated silica or a mixture thereof.

7. A cement composition comprising:
hydraulic cement;
water; and
a defoaming composition comprising an organic acid ester of a polyoxyethylene-polyoxypropylene block copolymer; wherein the polyoxyethylene-polyoxypropylene organic acid ester is a diesterification reaction product of a polyoxyethylene-polyoxypropylene block copolymer and oleic acid; and wherein the organic acid ester of the polyoxyethylene-polyoxypropylene block copolymer is of the general structure:

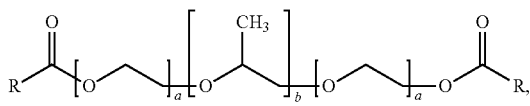

wherein R is $(CH_2)_7CH=CH(CH_2)_7CH_3$;
a is 2 to 8; and
b is 16 to 67.

8. The cement composition of claim 7, wherein the organic acid ester of the polyoxyethylene-polyoxypropylene block copolymer has an average molecular weight of 1650 to 5000 Daltons.

9. The cement composition of claim 7, further comprising hydrophobic silica.

10. The cement composition of claim 9, wherein the hydrophobic silica is at a weight ratio to the acid ester of the polyoxyethylene-polyoxypropylene block copolymer between 0.1 to 10 weight percent.

11. The cement composition of claim 9, wherein the hydrophobic silica is hydrophobized silica fume or precipitated silica or a mixture thereof.

12. The cement composition of claim 7, wherein the defoaming composition is at 0.01 to 1% by weight of the hydraulic cement.

13. The cement composition of claim 7, wherein the polyoxyethylene-polyoxypropylene organic acid ester has an average molecular weight of about 1665, about 2000, about 2565, about 3315, about 4365, or about 4965 Daltons.

14. A method of cementing a subterranean formation, comprising:
displacing a cement composition into the subterranean formation, the cement composition comprising hydraulic cement, water; and a defoaming composition comprising an organic acid ester of a polyoxyethylene-polyoxypropylene block copolymer; and
allowing the cement to set;
wherein the polyoxyethylene-polyoxypropylene organic acid ester is a diesterification reaction product of a polyoxyethylene-polyoxypropylene block copolymer and oleic acid; and wherein the organic acid ester of the polyoxyethylene-polyoxypropylene block copolymer is of the general structure:

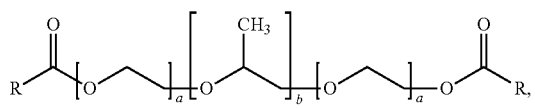

wherein R is $(CH_2)_7CH=CH(CH_2)_7CH_3$;
a is 2 to 8; and
b is 16 to 67.

15. The method of claim 14, wherein the displacing the cement composition comprises pumping the cement composition into an annular space between walls of a well bore and a casing during a primary or a remedial cementing operation.

16. The method of claim 14, wherein the hydraulic cement is foamed and the defoaming composition is added to the hydraulic cement in an amount effective to break the foam, thereby reducing gas entrainment in the hydraulic cement.

17. The method of claim 14, wherein the defoaming composition is at 0.01 to 1% by weight of the hydraulic cement.

* * * * *